(12) United States Patent
Pielmeier

(10) Patent No.: US 6,354,757 B1
(45) Date of Patent: *Mar. 12, 2002

(54) SECTION CONNECTOR

(75) Inventor: Günter Pielmeier, Bogen (DE)

(73) Assignee: Thyssen Polymer GmbH, Bogen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/031,936

(22) Filed: Feb. 27, 1998

(30) Foreign Application Priority Data

Feb. 28, 1997 (DE) .......................... 197 08 198

(51) Int. Cl.⁷ ................................. F16C 11/06
(52) U.S. Cl. ........................ 403/76; 403/90; 403/263; 52/655.1
(58) Field of Search .................. 403/76, 77, 90, 403/114, 115, 122, 142, 143, 141, 237, 70–71, 65, 84, 263; 52/DIG. 17, 653.2, 655.1, 736.2; 248/181.1, 181.2, 288.31, 288.51; 256/67

(56) References Cited

U.S. PATENT DOCUMENTS

| | | | | |
|---|---|---|---|---|
| 880,415 A | * | 2/1908 | Stevens | |
| 1,086,445 A | * | 2/1914 | Devlin | 403/90 X |
| 1,276,666 A | * | 8/1918 | Lohmann | 403/122 X |
| 1,435,347 A | * | 11/1922 | Taylor | 403/353 |
| 1,633,446 A | * | 6/1927 | Kleinhans | |
| 1,932,554 A | * | 6/1931 | McKee | |
| 2,662,766 A | * | 12/1953 | Burress | 403/122 X |
| 3,691,788 A | * | 9/1972 | Mazziotti | 464/139 X |
| 3,787,128 A | * | 1/1974 | Maistrelli | 403/135 X |
| 3,830,580 A | * | 8/1974 | Slattery et al. | 403/122 |
| 3,975,580 A | * | 8/1976 | Lewis | 52/697 X |
| 4,037,229 A | * | 7/1977 | Dunk | 248/288.31 X |
| 4,068,721 A | * | 1/1978 | Trayler | 172/1 X |
| 4,637,748 A | * | 1/1987 | Beavers | 403/141 X |
| 4,679,959 A | * | 7/1987 | Cavallaro | 403/143 |
| 4,692,054 A | * | 9/1987 | Kirby | 403/171 X |
| 4,766,712 A | * | 8/1988 | Hale | 52/645 |
| 4,767,231 A | * | 8/1988 | Wallis | 403/56 X |
| 4,881,737 A | * | 11/1989 | Mullins | 473/248 X |
| 4,936,701 A | * | 6/1990 | Allen et al. | 403/57 X |
| 4,991,371 A | * | 2/1991 | Preuss et al. | 52/653.2 |
| 5,056,951 A | * | 10/1991 | Mariani | 403/90 |
| 5,088,882 A | * | 2/1992 | Davister | 403/90 X |
| 5,265,972 A | * | 11/1993 | Bahr | 403/252 X |
| 5,305,571 A | * | 4/1994 | Trevino | 52/653.2 |
| 5,357,729 A | * | 10/1994 | Schutze | 52/653.2 |
| 5,409,332 A | * | 4/1995 | Chabot, Jr. et al. | 403/114 |
| 5,626,434 A | * | 5/1997 | Cook | 403/176 X |
| 5,657,604 A | * | 8/1997 | Malott | 52/655.1 |
| 5,673,531 A | * | 10/1997 | Carcedo et al. | 52/656.9 X |
| 5,676,484 A | * | 10/1997 | Chamberlin et al. | 403/122 |
| 5,794,398 A | * | 8/1998 | Kaehler et al. | 403/169 |

* cited by examiner

*Primary Examiner*—Harry C. Kim
(74) *Attorney, Agent, or Firm*—Pitney, Hardin, Kipp & Szuch LLP

(57) ABSTRACT

The device is a section connector for building structures, such as, for instance, a rafter assembly section connector for winter gardens or the like, with the aid of which a hollow section can be attached to another hollow or solid section at variable angles. An inset equipped with a ball head is firmly attached to one section. Using the ball head, the inset is connected to a structural part attached to another section in such a way that it can pivot.

3 Claims, 2 Drawing Sheets

SECTION CONNECTOR

BACKGROUND OF THE INVENTION

1. Field of the Invention

The invention concerns a section connector for building structures, such as, for instance, rafter assembly section connectors for winter gardens, windows, doors or the like, with the aid of which a hollow section, for instance a rafter section, can be attached at variable angles to another hollow section, for instance a crossbar section, or hollow or solid section, by means of a section connector element inserted into the one hollow section.

2. Description of the Related Art

Section connectors of this type for window, post, crossbar and other sections are already known to the art. Such section connectors are described, for instance, in the patents DE GM 93 03 883.6, DE GM 295 01 410 U1 and the as yet unpublished German patent application 196 31 891.2. In these publications, several section connector angles in one plane are possible, but not in more than one plane.

In the past, rafter assembly section connectors, used for instance for rafters in winter gardens and the like, could be achieved only by angular cutting and subsequent welding of the sections, preferably steel sections. The process of cutting and welding the steel sections is difficult and costly, because very expensive, high-precision machinery must be used to perform this work.

SUMMARY OF THE INVENTION

Therefore, the objective of the invention, as described in the claims, is to provide an easy-to-manufacture section connector, such as a rafter assembly connector, for winter gardens, for instance, that makes it possible to connect sections in three planes.

The advantages offered by the invention derive especially from the fact that sections can easily be connected with structural parts by means of screwing and assembly in three planes of 45°–90°. Welding is no longer necessary, no machinery is required and other costly, time-consuming work steps are eliminated.

BRIEF DESCRIPTION OF THE DRAWINGS

The invention is described in more detail below with the aid of an execution example depicted in the figures.

DESCRIPTION OF THE PREFERRED EMBODIMENTS

Figure 1:
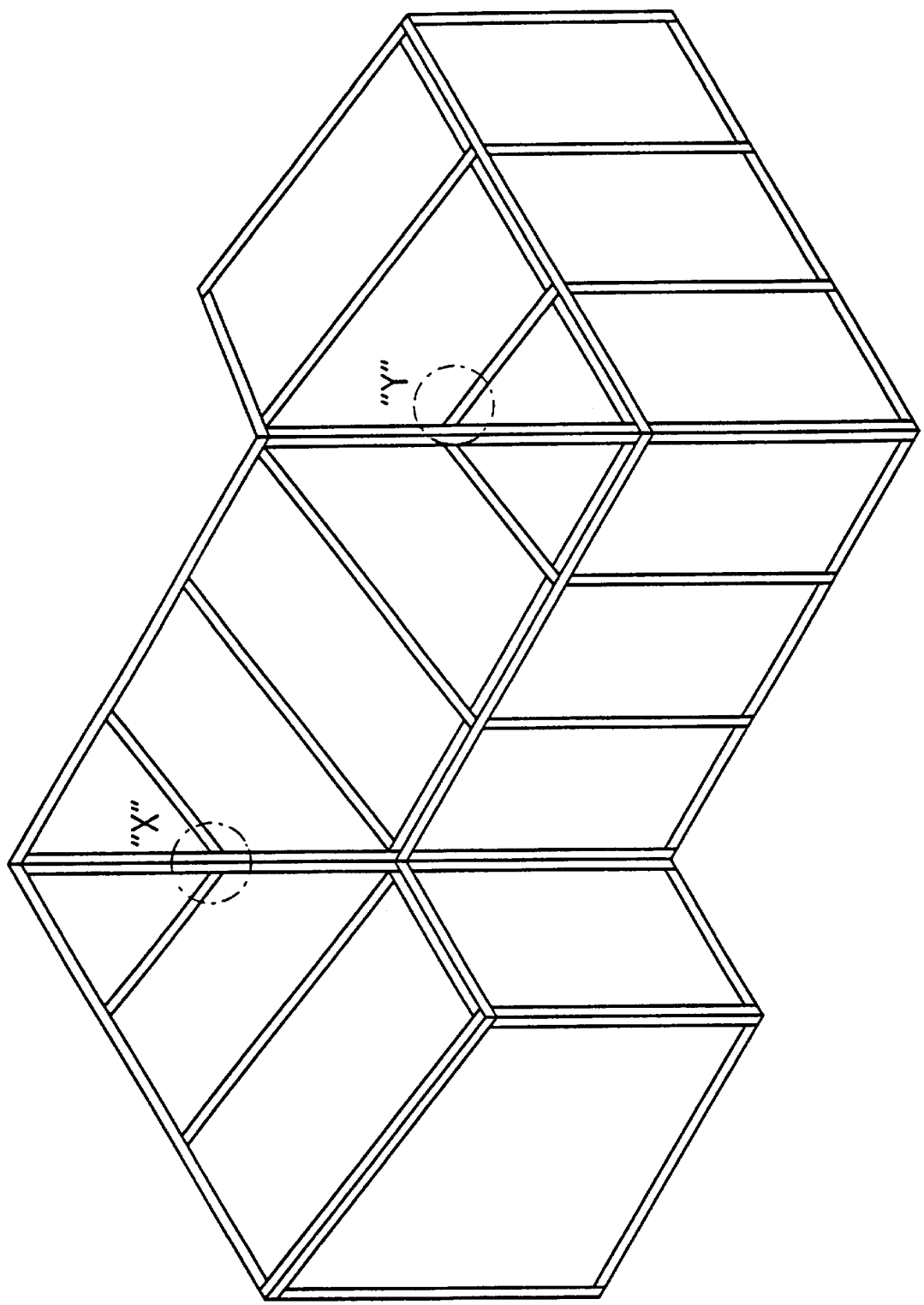
FIG. 1 depicts a winter garden with sections "X" and "Y" representing the rafter assembly section connectors shown in FIG. 2.
Figure 2:
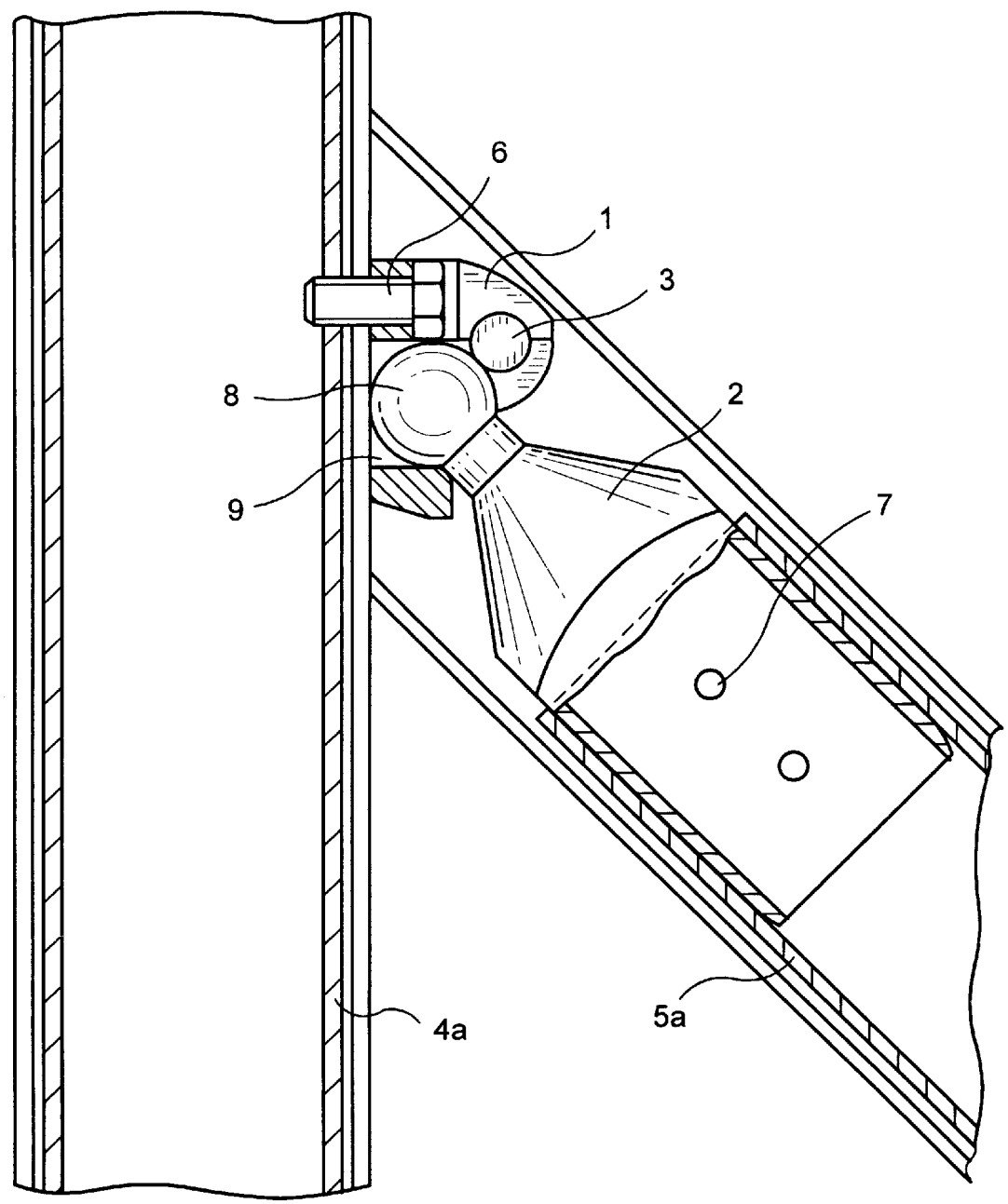
FIG. 2 depicts a rafter assembly section connector specific to the invention.

The rafter assembly section connectors "X" and "Y" shown in FIG. 1 are described in more detail with the aid of FIG. 2.

The rafter assembly section connectors "X" and "Y" consist of the same parts, but are arranged at different angles and directions.

FIG. 2 shows a mounting piece 1, for instance a fastening plate, attached to a section 4a, for instance a rafter, by means of one or several screws 6. The ball head 8 of the section connector element 2, for instance a rafter connector, is inserted into the receiver 9 of the mounting piece 1 and fastened by means of a dowel pin 3. The back side of the connector 2 is designed in such a way that it can be connected to a section 5a in a suitable manner, for instance by means of fastening devices such as screws screwed into the screw channels 7. In this example, the section 5a is designed as a hollow section in which the section connector element can be inserted and screwed in place. Solid sections can also be used for this purpose.

The indicated section connector is variable, within broad limits, with regard to the angle and planes at which the two sections 4a, 5a can be connected. Thus, in the example represented here, the two sections 4a and 5a can be connected to each other in three planes with angles between 45° and 90°.

As materials, steel in particular has proven to be effective for the sections 4a and 5a, covered by plastic hollow sections as trim sections.

Naturally, the invention is not limited to the described application for winter gardens. It can also be advantageously used in other applications, such as greenhouses, facades, windows, doors, gratings, etc.

What is claimed is:

1. A section connector comprising a first connector element mechanically attached to a hollow section of a building structure and pivotally secured to a mounting piece by a dowel pin, wherein said mounting piece is adapted to be attached to a cross/solid section of an angle rafter such that said section connector can pivot or rotate with at least two degrees of freedom relative to said angle rafter.

2. The section connector for building structures of claim 1 wherein a top end of the section connector element includes a ball head for insertion into a receiver of the mounting piece and a lower end includes a fastening device for the hollow section.

3. The section connector for building structures of claim 2 wherein the ball head of the section connector element can be inserted into the receiver of the mounting piece throughout a range of angles to the angle rafter.

* * * * *